Aug. 2, 1960  M. BAUMANN  2,947,332
DOUBLE-SURFACE PLANER FOR WOOD STRIP MATERIAL
Filed Aug. 19, 1958  3 Sheets-Sheet 1

INVENTOR.
MANFRED BAUMANN
BY Leon M. Straus

Aug. 2, 1960 M. BAUMANN 2,947,332
DOUBLE-SURFACE PLANER FOR WOOD STRIP MATERIAL
Filed Aug. 19, 1958 3 Sheets-Sheet 3

INVENTOR.
MANFRED BAUMANN

United States Patent Office 2,947,332
Patented Aug. 2, 1960

2,947,332

DOUBLE-SURFACE PLANER FOR WOOD STRIP MATERIAL

Manfred Baumann, St. Margrethen, Switzerland, assignor to Bauwerk A.G., St. Margrethen, Switzerland, a company of Switzerland Filed Aug. 19, 1958, Ser. No. 755,965

6 Claims. (Cl. 144—116)

This invention relates to a machine for the manufacture of small parquet battens.

An object of the present invention is the provision of a machine of a semi-automatic type which is comparatively inexpensive in production and which will operate most efficiently in the manufacture of parquet battens of small size.

Another object of the present invention is the provision of a machine of the described type which is provided with a novel and most effective control device used for planing of parquet battens.

Another object is the provision of a machine with a slide for holding and guiding the workpiece between planing cylinders, whereby said slide cooperates with a control device so that clamping and releasing of the workpiece is a predetermined function of the position of the slide.

Still another object of the invention is that the slide together with the workpiece is moved at uniform speed between the planing cylinders, also when the workpiece is uneven as a result of the different thickness of the board to be planed.

An embodiment of the invention is illustrated in the attached drawing, in which.

Figure 1:
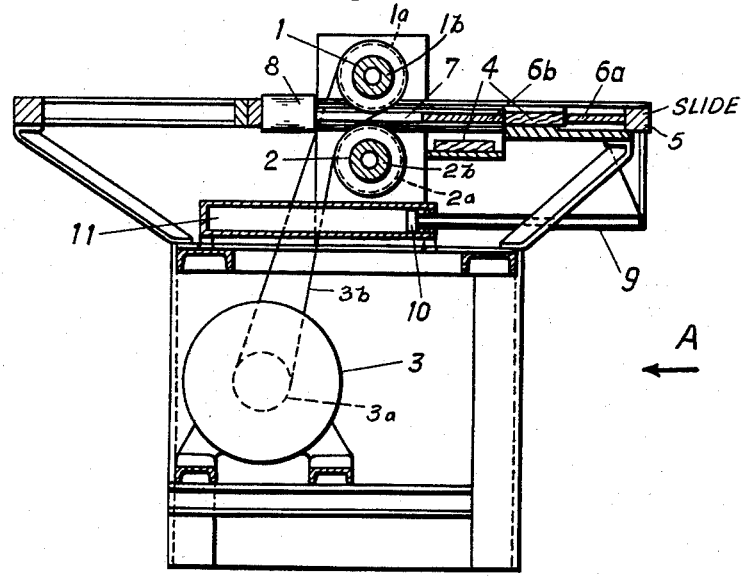
Fig. 1 is a cross-sectional view of the planing machine according to this invention.
Figure 2:
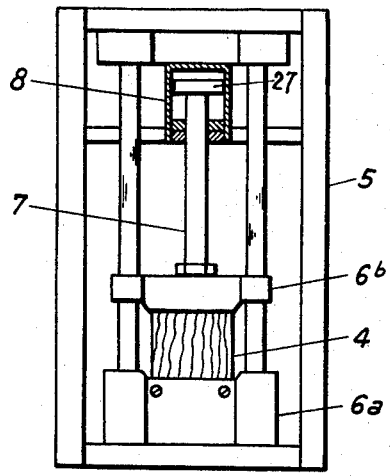
Fig. 2 is a plan view of an oscillating slide of the machine.
Figure 5:
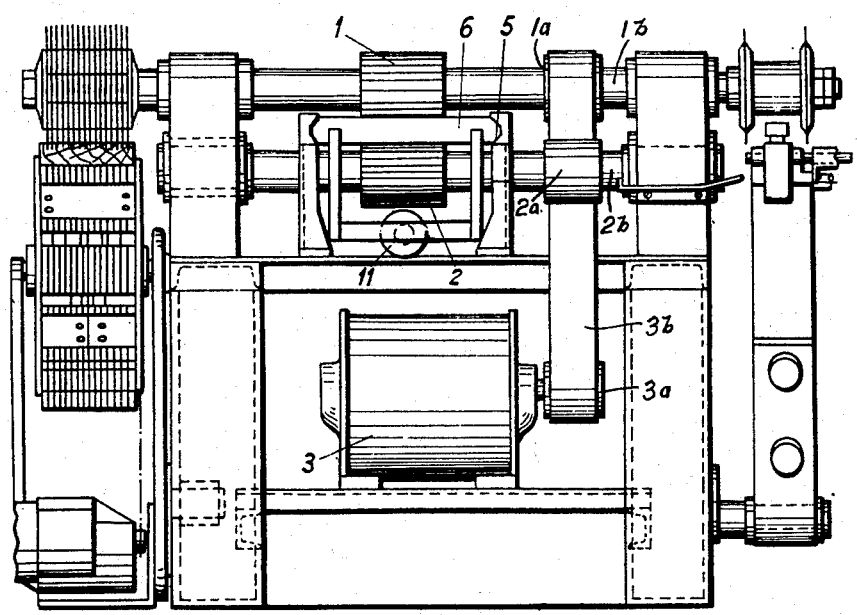
Fig. 5 is an elevational view of the machine in direction of arrow A in Fig. 1.

The machine according to Figs. 1 and 5 is designed for the manufacture of small parquet strips for floorings and the different steps are described in more detail in the co-pending patent application Serial No. 640,226. The machine has a frame F of any suitable configuration and is equipped with two oppositely rotating planing cylinders 1 and 2 which are driven by an electric motor 3 and are arranged parallel to and spaced from each other. The electric motor 3 drives a pulley 3a, Figs. 1 and 5, over which endless band 3b is entrained. The band 3b engages the pulleys 1a and 2a mounted respectively on shafts 1b and 2b. The planing cylinders 1 and 2 are mounted on shafts 1b and 2b respectively. The band 3b is relatively wide and has sufficient contact with both pulleys 1a and 2b to properly effectuate the drive thereof. These planing cylinders 1 and 2 are designed for planing both surfaces of the workpiece 4—which are board sections—simultaneously. The slide 5 is so designed that it can move in a horizontal plane in a straight line between the planing cylinders 1 and 2. The board or workpiece 4 has its small forward and rear edge held firmly by a clamping device comprising a stationary board holder or clamping member 6a and a mobile board holder or clamping member 6b. The mobile clamping member 6b is connected with a piston 27 via a rod 7 carried by the frame of the slide. The piston 27 is movably guided in the cylinder 8 and is actuated by means of compressed air through a flexible tube, to thereby either clamp or release the workpiece 4. The clamping member engages only the forward and rear edge of the workpiece 4 and is thinner than the space between the planer knives of the cylinders. The slide 5 is connected with a rod 9 which co-operates with the hydraulically actuated piston 10 sliding in cylinder 11. The cylinder 11 is stationary and connected with the frame of the machine.

Figure 3:
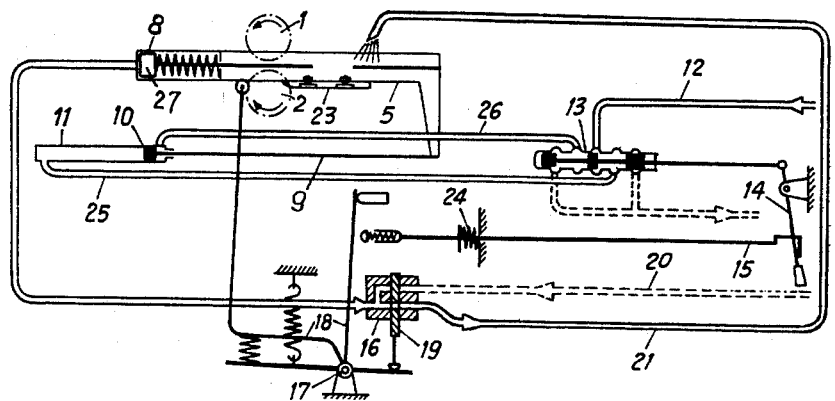
Fig. 3 shows the control diagram of the machine with the slide in a first initial position.
Figure 4:
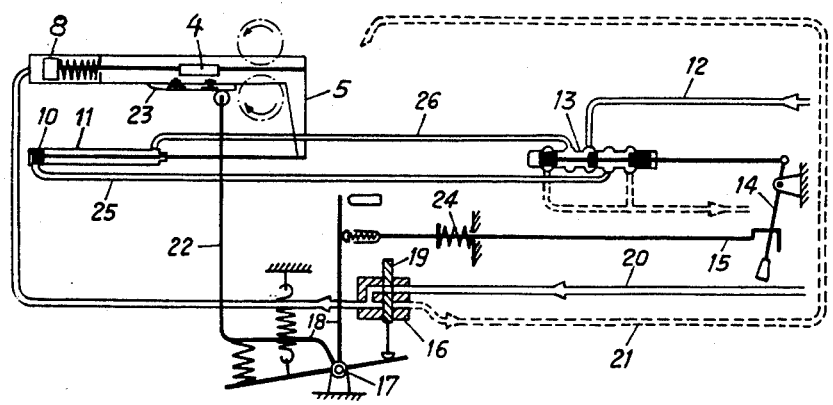
Fig. 4 shows the control diagram according to Fig. 3 with the slide in a second operative position.

The control of these devices is shown in Figs. 3 and 4. The feeding line 12 for the hydraulic medium, as an example oil, is connected with a control valve 13 of which a piston can be actuated by means of a hand lever 14. The control valve 13 is so designed that it acts upon the supply and removal of the hydraulic medium to and from the double action piston 10. Co-operating with the hand lever 14 is an actuating rod 15 which acts on a control valve 16 for compressed air, via a linkage 18 swivelled on pivot 17. This compressed-air control valve is connected with the feeding line 20 and arranged between a compressed air source (not shown) and a piston 8. According to the position of the gate 19 of the control valve 16, the air supply line 20 or the exhaust line 21 are alternatively opened or closed. The exhaust line 21 ends in the vicinity of the supporting surface of the workpiece in the initial position of the slide and serves to clean it from sawdust and wood splinters produced in processing.

The end of lever arm 22 of the linkage 18 engages a cam 23 arranged on the slide 5. This cam causes the drain line to open only when the workpiece is no longer in the range of the planing cylinders 1, 2, so that the workpiece during machining cannot inadvertently be released.

The machine operates as follows: The workpiece 4 is placed manually between the clamping members 6a, 6b on a stationary support. The hand lever is actuated (in Figs. 3 and 4 in clockwise direction) so that the actuating rod 15 is displaced by the action of the spring 24. This swivels the linkage 18 which in turn causes the control valve 16 to be actuated so that the valve slide or the gate 19 opens the supply line 20 to enable compressed air to flow into cylinder 8. This results in the piston 27 arranged in this cylinder 8 moving the rod 7 and the clamping member 6b towards the workpiece 4 so as to hold its narrow edges. At the same time, or shortly after opening the air supply line 20 of the compressed-air control valve 16, the hydraulic control valve 13 will open the supply of line 12 by displacing the piston accommodated therein. This causes the control medium to flow into cylinder 11 through line 26 and to move piston 10 so that the slide 5 connected therewith and the workpiece 4 move toward the planing cylinders 1 and 2 and subsequently between the said cylinders. After completion of the planing process the lever 14 is manually moved in the opposite direction (in the drawing: in counterclockwise direction) which causes the pistons of the control valve 13 to be displaced so that the line 25 is connected with the supply line 12. The control medium flows to the other side of the piston 10 and moves it in the opposite direction together with the slide 5 connected therewith. The line 26 then serves to return the control medium. Said actuation of the lever 14 (in the drawing: in counterclockwise direction) also displaces the rod 15. The position of the control valve for the compressed air cannot, however, change while the lever 22 has its end engaging the projecting portion of the cam 23. Only when the slide 5 with the cam 23 attached thereto has been displaced near its initial position will the lever 22 no longer engage the cam 23 (see Fig. 3), and the control valve 16 can close the air supply line 20 and open the exhaust line 21 so that the clamping members 6a, 6b release the workpiece. The cam 23 is advantageously so designed that the workpiece is released when the slide 5 is located away from its initial position by about one-half or more of the length of the work. This causes the work automatically to fall on an inclined sliding surface and reaching then the next machining station. The exhaust air is blown against the supporting surface of the work by line 21 so that it is cleaned and readied to take up the next workpiece.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A machine for the production of small parquet battens comprising the combination of two planer knife cylinders arranged parallel to and spaced from each other, a slide for sliding movement between said planer knife cylinders, said slide including a board holder having clamping members engaging respectively the forward and rear edge of the workpiece and being thinner than the space between said cylinders, actuating means carried by said slide for movement of said clamping members between an operative and an inoperative position, drive means connected to said slide for moving of said slide, and control means connected to said actuating means and said drive means for controlling the sequence of actuation of said actuating means and said drive means by first causing operation of said actuating means and subsequently causing operation of said drive means.

2. A machine for the production of small parquet battens comprising the combination of two planer knife cylinders arranged prallel to and spaced from each other, a slide for sliding movement between said planer knife cylinders, said slide including a board holder having clamping members engaging respectively the forward and rear edge of the workpiece and being thinner than the space between said cylinders, a hand lever, a first cylinder being fixed on said slide with a first piston movable therein, one of said clamping members being connected to said first piston means for effecting engagement and releasing of a board section by said clamping members in determined positions of said hand lever, a second cylinder and a second piston slidably mounted in said second cylinder and connected with said slide for actuation thereof, fluid conveying means connected to said second cylinder for actuating said second piston and including a valve controlling fluid flow to said second cylinder by said fluid conveying means, said valve being actuated by said hand lever and actuating said second piston after said first piston has been actuated.

3. A machine according to claim 2, wherein said first piston is actuated pneumatically and said second piston is actuated hydraulically.

4. A machine according to claim 2, including an exhaust line ending near said clamping members in the initial position of said slide for cleaning said clamping device, said exhaust line being connected to said first cylinder.

5. A control system in a machine for the production of small parquet battens having two planer knife cylinders, comprising a first valve connected with a first cylinder, a second valve connected with a second cylinder, said first cylinder being carried by a slide movable between said two planer knife cylinders, said slide having board holding members including clamping means, piston means slidably mounted in said second cylinder and connected with said slide for moving said slide, and operating means cooperating with said first cylinder and so constructed that said clamping means releases said board after the machining is completed during the reverse movement of the slide, a distance corresponding to more than one-half of the length of said board, from the initial position of said slide.

6. A machine for the production of small parquet battens comprising a frame, a pair of planer knife cylinders mounted in vertically spaced relationship on said frame, a slide mounted on said frame for horizontal movement, said slide being movable into the space between said cylinders, said slide including clamping means for holding the forward and rear edge of a workpiece with said workpiece being of greater height dimension than said clamping means, first drive means for driving said cylinders connected thereto, second drive means connected to said slide for moving said slide, actuating means carried by said slide for actuating said clamping means to move said clamping means between an inoperative and an operative position, and control means connected to said actuating means and said second drive means for first permitting operation of said actuating means and then permitting operation of said second drive means.

References Cited in the file of this patent

UNITED STATES PATENTS

| | | |
|---|---|---|
| 565,463 | Kellogg | Aug. 11, 1896 |
| 1,873,818 | Burns | Aug. 23, 1932 |
| 2,054,296 | Merrill | Sept. 15, 1936 |
| 2,102,186 | Nicholson et al. | Dec. 14, 1937 |
| 2,819,744 | Chvet et al. | Jan. 14, 1958 |

FOREIGN PATENTS

| | | |
|---|---|---|
| 517,979 | Germany | Feb. 12, 1931 |
| 140,167 | Austria | Jan. 10, 1935 |
| 1,059,741 | France | Nov. 10, 1953 |